United States Patent
Huang

(10) Patent No.: US 6,567,284 B2
(45) Date of Patent: May 20, 2003

(54) DC TO DC CONVERTING INCORPORATING ZVS CIRCUIT AND SYNCHRONIZED ISOLATION CIRCUIT

(75) Inventor: Chung-Tsai Huang, Hsinchu (TW)

(73) Assignee: Ambit Microsystems Corp. (TW)

( * ) Notice: Subject to any disclaimer, the term of this patent is extended or adjusted under 35 U.S.C. 154(b) by 43 days.

(21) Appl. No.: 09/897,474

(22) Filed: Jul. 3, 2001

(65) Prior Publication Data

US 2002/0064060 A1 May 30, 2002

(30) Foreign Application Priority Data

Nov. 27, 2000 (CN) .......................... 89125121 A

(51) Int. Cl.[7] .............................. H02M 3/24
(52) U.S. Cl. ........................... 363/98; 363/132
(58) Field of Search ................. 363/17, 56.02, 363/56.05, 98, 132

(56) References Cited

U.S. PATENT DOCUMENTS 3,582,758 A * 6/1971 Gunn .......................... 363/127
3,663,941 A * 5/1972 Pasciutti ..................... 363/23
4,519,024 A * 5/1985 Federico et al. ............ 363/127
6,246,592 B1 * 6/2001 Balogh et al. ............... 363/16

* cited by examiner

Primary Examiner—Shawn Riley
(74) Attorney, Agent, or Firm—Michael D. Bednarek; Shaw Pittman LLP

(57) ABSTRACT

A DC to DC converter having a simplified logic circuit with both zero voltage switch function and synchronous rectification function, including a transformer having a primary coil and a second coil, a first half-bridge switch coupled to one end of the primary coil, a second half-bridge switch coupled to the other end of the primary coil, a first synchronous rectifier coupled to one end of the second coil, a second synchronous rectifier coupled to the other end of the second coil. The switching between the first half-bridge switch and the second half-bridge switch is made through the leakage inductance of the transformer and the open of the first synchronous rectifier and the second synchronous rectifier is made by the coil resistance of the transformer.

10 Claims, 6 Drawing Sheets

US 6,567,284 B2

DC TO DC CONVERTING INCORPORATING ZVS CIRCUIT AND SYNCHRONIZED ISOLATION CIRCUIT

BACKGROUND OF THE INVENTION

1. Field of the Invention

The present invention generally relates to a simplified logic circuit. More specifically, the present invention is directed to a DC to DC converter having a simplified logic circuit with a half-bridge rectifier, a synchronized rectification and a zero voltage switch (ZVS).

2. Description of the Related Art

Switching converters are widely utilized in changing electrical energy from one level of the voltage to another level of the voltage. As logic integrated circuits have migrated to lower working voltages in the search for higher operating frequencies. For instance, a power supply in a personal computer can provide for output voltage of 12 DC volts, however a CPU may need steady low voltages such as 5 DC volts, 3.3 DC volts or 2.5 DC volts. Lower voltages such as 1.82 DC volts are even required for a new generation of the CPU. As for the convert of DC voltages, it is not be completed by only a transformer and this convert should be achieved by rectifying, downgrading and re-rectifying. These converters are usually operated in a high frequency so as to cause the loss of electric energy, especially in voltages lower than 5 DC volts. Additionally, the above loss of electric energy is mainly because of the conductive loss and the switching loss in the electric circuit.

In conventional technology, there are so many methods to reduce the conductive loss and the switching loss in the electric circuit. For instance, a forward circuit, a half-bridge circuit, a bridge circuit, a self-oscillation circuit, a push-pull circuit, a synchronized circuit or a ZVS are usually used in the converters. When merely using one of the forward circuit, the half-bridge circuit, the bridge circuit, the self-oscillation circuit and the push-pull circuit to complete the switch convert, the efficiency of the electric circuit is low due to the high switching loss and thus the volume of the circuit becomes large. Therefore, in practice, the synchronized circuit or the ZVS may be added into the circuit to increase the efficiency of the same and to provide steady low DC volts, such as a combined circuit having the forward circuit and the synchronized circuit, a combined circuit having the push-pull circuit and the synchronized circuit, a combined circuit having the half-bridge circuit and the ZVS, a combined circuit having the bridge circuit and the ZVS, a combined circuit having the self-oscillation circuit and the ZVS, or a combined circuit having the push-pull circuit and the ZVS.

However, the volume of the above combined circuits with the synchronized function is too large and the control function is so complex that the components are not easily selected. Therefore, the manufacturing cost of the circuit increases accordingly. Although the volume of the combined circuits with the ZVS function can be effectively reduced, the problem that the control function is so complex that the components are not easily selected and thus the manufacturing cost of the circuit increases accordingly will be still existed. Additional, as the synchronized circuit in combination with the ZVS causes cross talk loss and makes this circuit more complex. Thus, it is not to combine these two circuits in DC to DC converter. For stated above, it is necessary to develop a low cost and high efficiency DC to DC converter.

SUMMARY OF THE INVENTION

Therefore, it is an object of the present invention to provide a DC to DC converter for combining a simplified synchronous rectification circuit and a zero voltage switch circuit, thereby the DC to DC converter can reduce the volume of the circuit and lower the manufacturing cost. Another object of the present invention is to provide a DC to DC converter having high switching efficiency on the primary side. Thus, the DC to DC converter can transport a voltage output without cross talk loss. Another object of the present invention is to provide a DC to DC converter transporting a voltage output with no ripples through by half-period turns switch. Thus, the total converting efficiency of the DC to DC converter is largely increased.

Another object of the present invention is to provide a DC to DC converter with a simplified circuit, thereby decrease the components of the DC to DC converter to lower the manufacturing cost.

BRIEF DESCRIPTION OF DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE INVENTION

Figure 1:
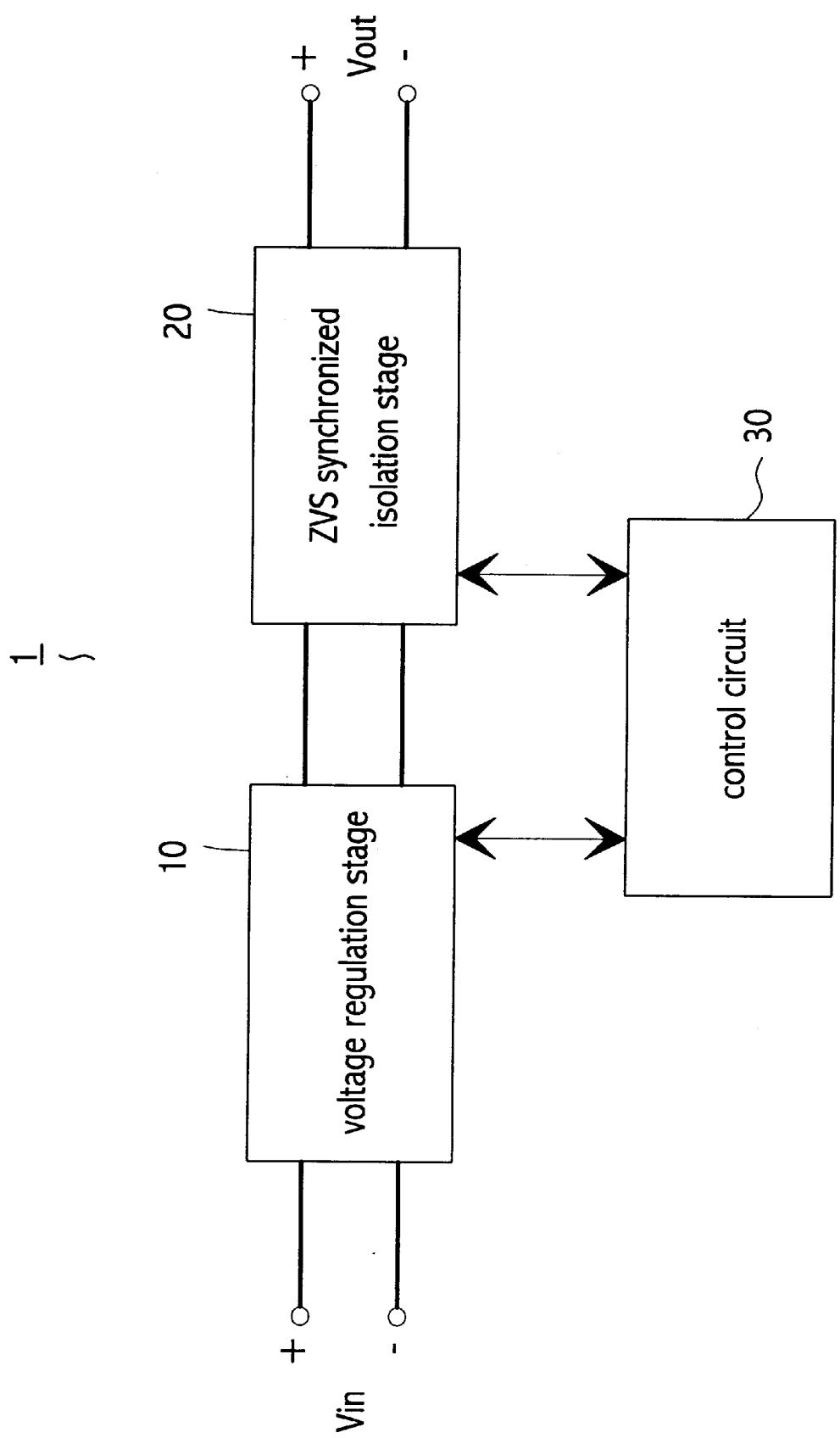
FIG. 1 schematically depicts a block diagram of a DC to DC converter in accordance with one preferred embodiment of the present invention.

FIG. 1 schematically depicts a block diagram of a DC to DC converter in accordance with one preferred embodiment of the present invention. Referring to FIG. 1, a DC to DC converter 1 is installed in a computer so as to steadily convert one level of the DC voltage to another level of the DC voltage. Although a power supply in a personal computer can provide 12 DC volts, however a CPU may need steady low voltages such as 5 DC volts, 3.3 DC volts, 2.5 DC volts or 1.82 DC volts. Therefore, the DC to DC converter 1 comprises: a voltage regulation stage 10, a ZVS synchronized isolation stage 20 and a control circuit 30. The voltage regulation stage 10 is a simplified buck converter so that the output voltage can be pre-adjusted. The ZVS synchronized isolation stage 20 combines a half-bridge on the primary side of a transformer and the zero voltage switch is made because of the leakage of the transformer. The control circuit 30 provides signals to the zero voltage switch and the synchronous rectification. The following specification and figures will further describe the circuit and control procedures of the present invention.

Figure 2:
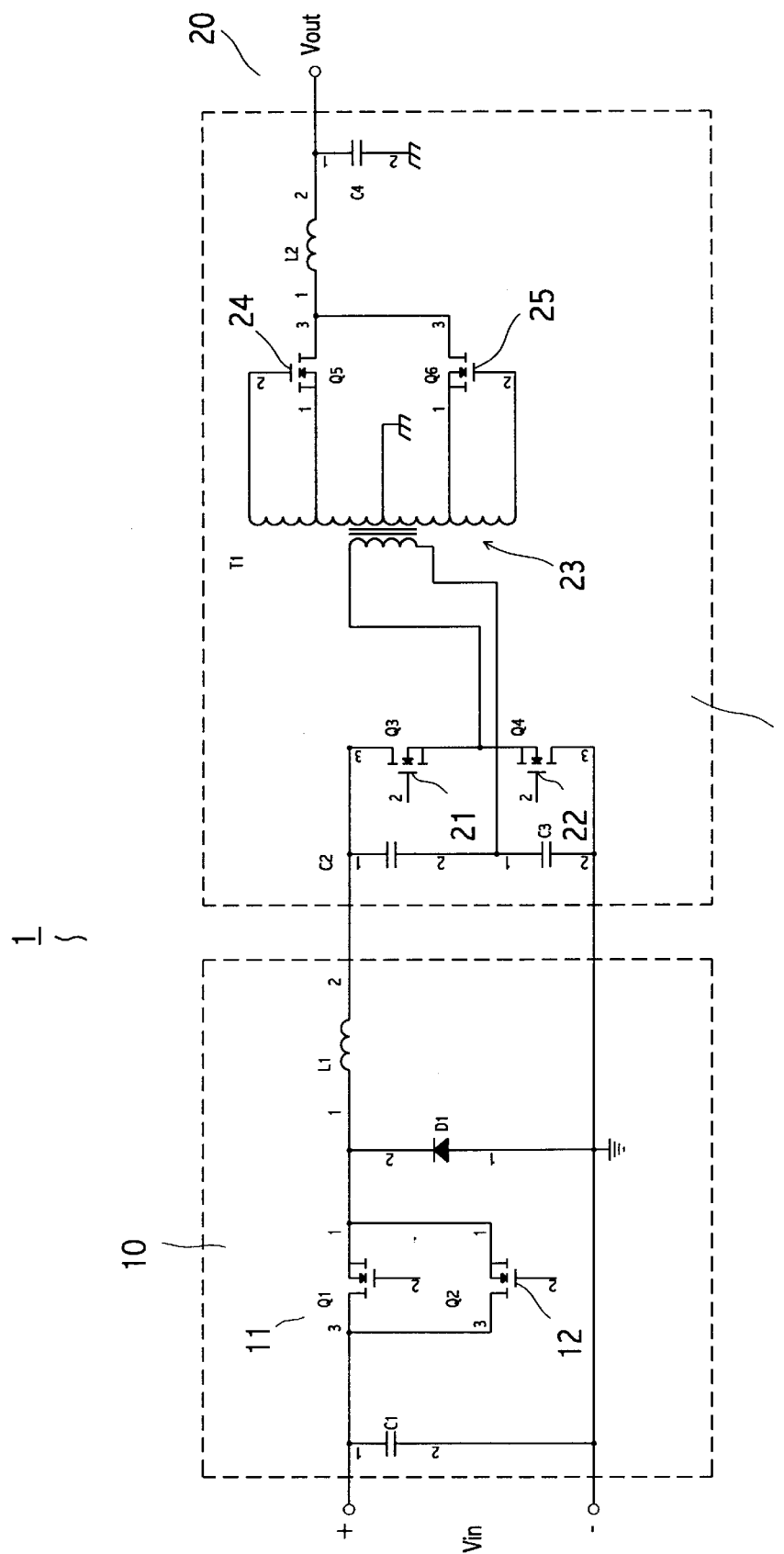
FIG. 2 schematically depicts a DC to DC converter circuit of the present invention.

FIG. 2 shows the DC to DC converter circuit of the present invention. The circuit of the DC to DC converter 1 is comprised of the voltage regulation stage 10 and the ZVS synchronized isolation stage 20. As shown in FIG. 2, the DC to DC converter has two primary side switches 11 and 12, two half-bridge switch 21 and 22, a transformer 23, and two synchronous rectifiers 24 and 25. In the preferred embodiment, is formed from a primary side coil and a second side coil and the above switches or rectifiers can be MOSFETs or other type of transistors.

Figure 3:
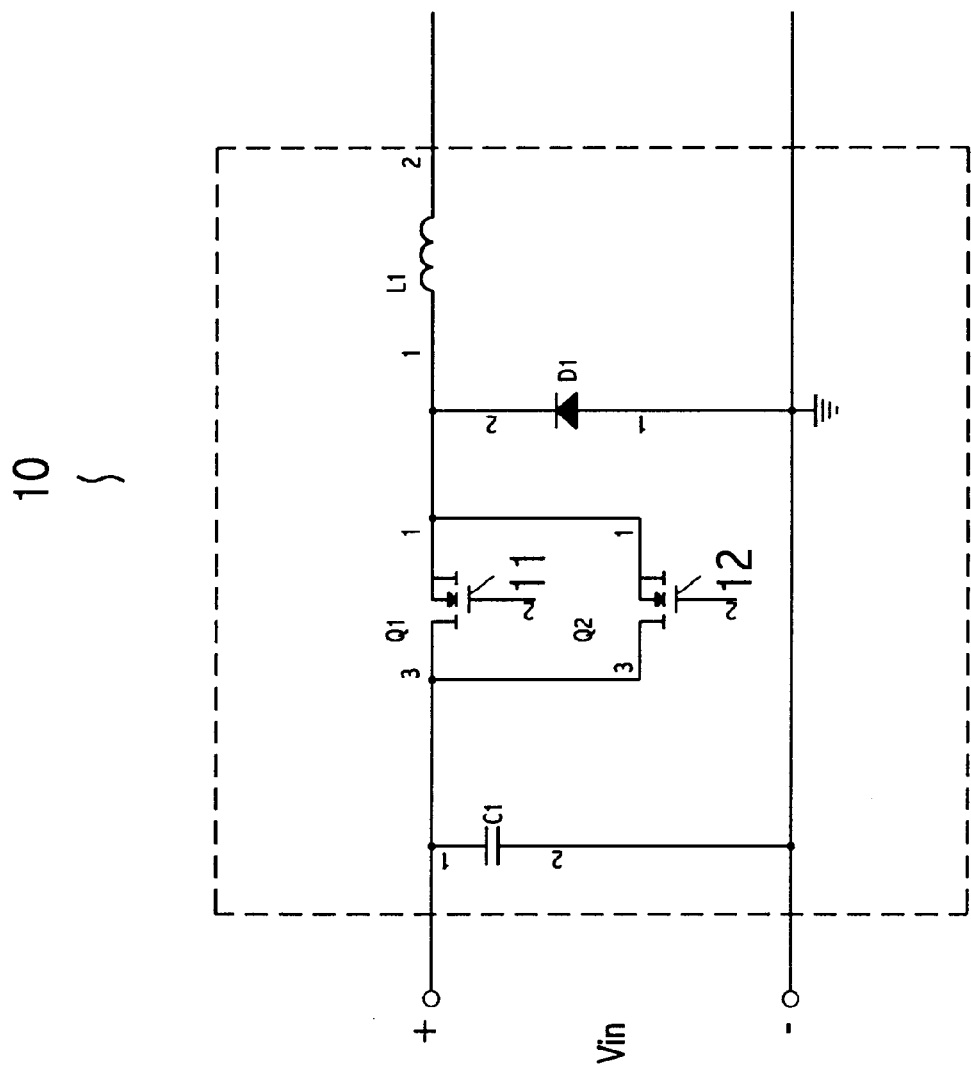
FIG. 3 shows a voltage regulation stage circuit of the present invention.
Figure 4:
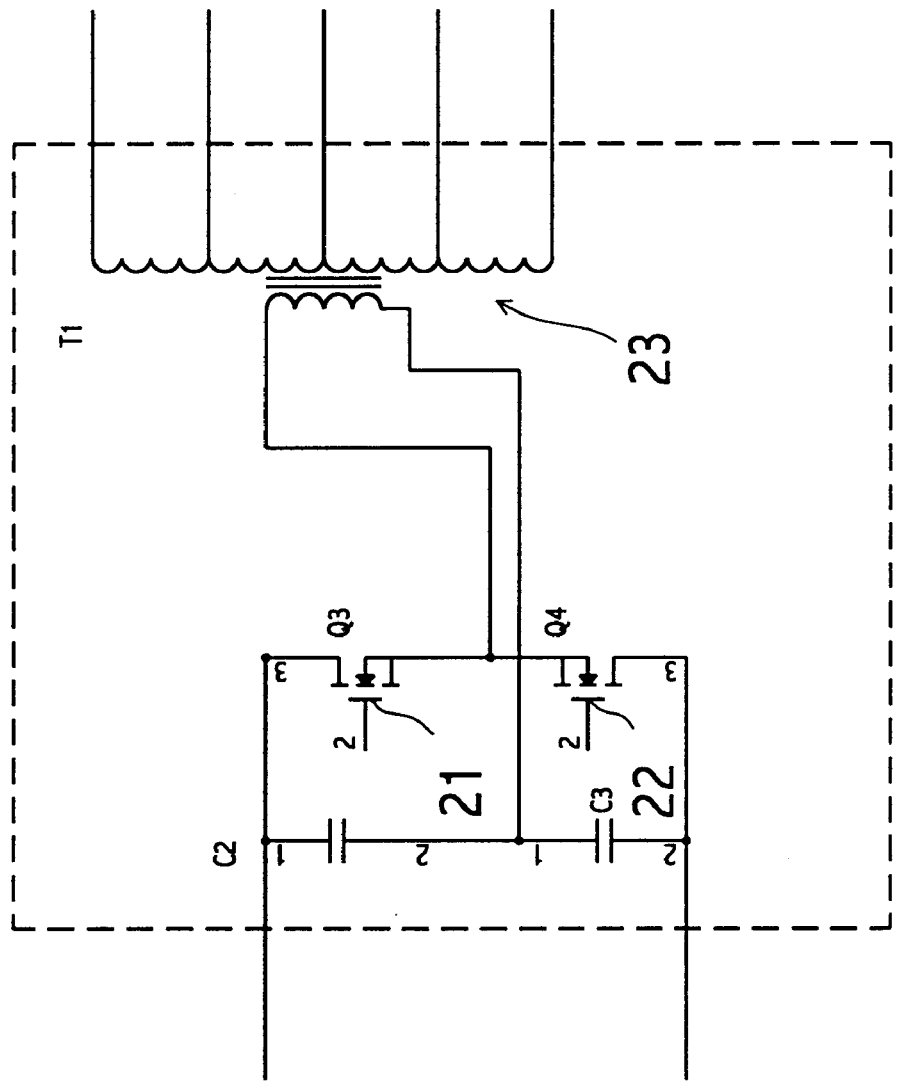
FIG. 4 shows a zero voltage switch stage circuit of the present invention.
Figure 5:
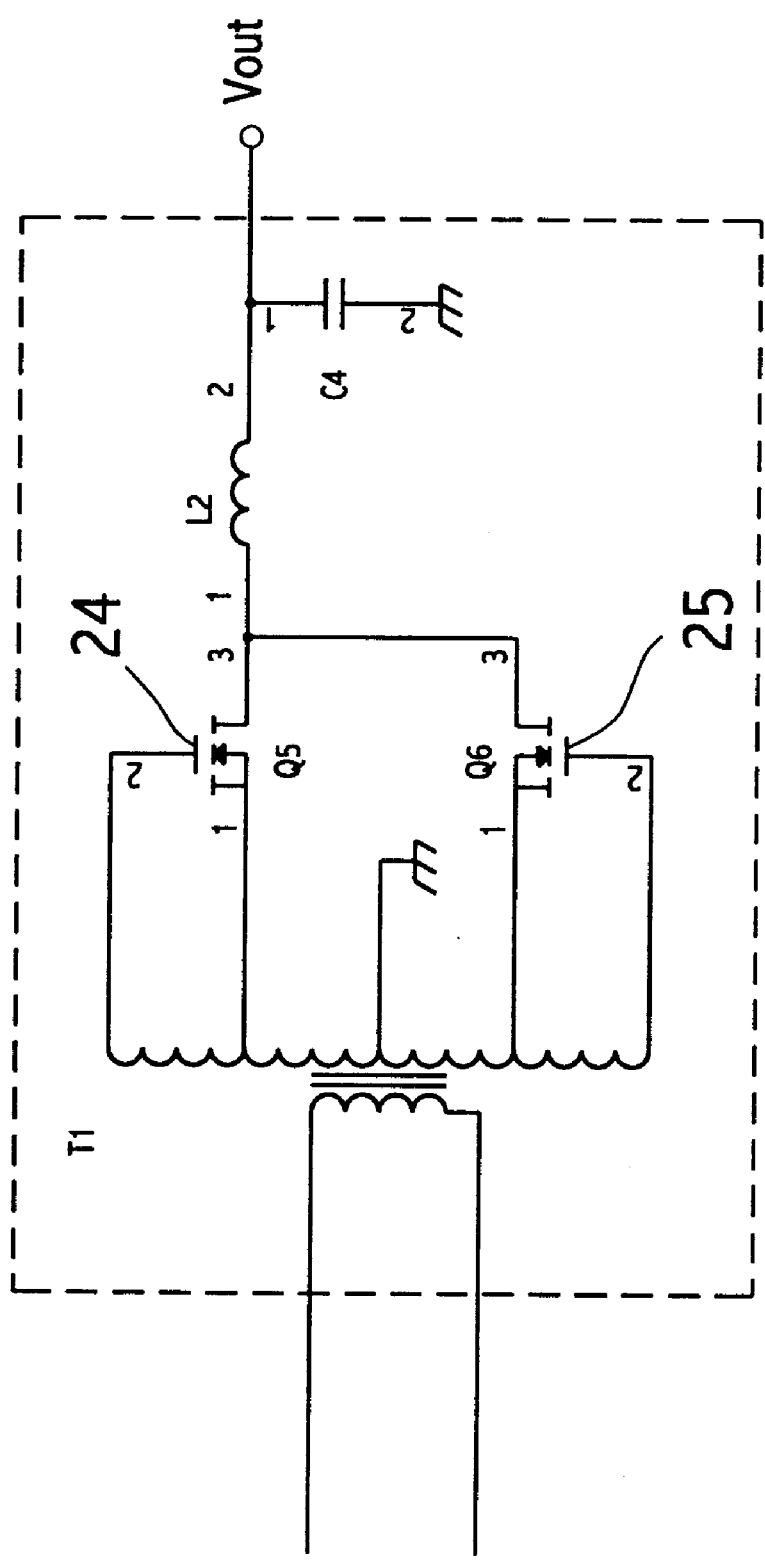
FIG. 5 shows a synchronized isolation stage circuit of the present invention.

Please further refer to FIG. 3, FIG. 4 and FIG. 5 to describe the operation status of the DC to DC converter by different stages. As shown in FIG. 3, the voltage regulation stage 10 is separated and formed on the primary side of the transformer 23. The voltage regulation stage 10 is a simplified buck converter so that the output voltage can be pre-adjusted and comprises: two primary side switches 11 in parallel, a capacitor C1, a diode D1 and an inductor L1. The DC voltage is adjusted by the voltage regulation 10 and then is inputted into the ZVS synchronized isolation stage 20.

In FIG. 2, the ZVS synchronized isolation stage 20 comprises: a half-bridge circuit with ZVS function which is formed in the primary side of the transformer 23 as shown in FIG. 4 and a synchronized isolation circuit which is formed in the second side of the transformer 23 as shown in FIG. 5.

Referring to FIG. 4, the half-bridge circuit is formed in the primary side of the transformer 23 and comprises: two half-bridge switches 21 and 22 in series, and two capacitors C2 and C3. The DC voltage is converted into an AC voltage be the half-bridge circuit so as to change the voltage level through the transformer 23. It is noted that the half-bridge switches 21 and 22 can be enabled due to a leakage inductance of the coil of the transformer 23 itself and be switched as a 50% period in turn so as to achieve the ZVS function. Therefore, the present invention does not need any conventional complex circuits, such as: adding extra inductors or changing the frequency of the input voltage, to achieve the ZVS function.

Further referring to FIG. 5, the synchronized isolation circuit is formed in the second side of the transformer 23 and comprises: two synchronous rectifiers 24 and 25 which are connected to both sides of the transformer 23 separately, a capacitor C4 and a inductor L2. It is noted that the synchronous rectifiers 24 and 25 can be enabled due to the coil resistance of the transformer 23 itself so as to achieve the synchronized isolation function. Therefore, the present invention does not need any conventional extra circuits avoiding the cross talk loss to achieve the synchronized isolation function.

In addition, as the half-bridge switches 21 and 22 are enabled due to the leakage inductance of the transformer 23 and are switched as a 50% period in turn, the output voltage to the transformer 23 is no ripple voltage. Therefore, the capacitor C4 and the inductor L2 can be selected from small value with no ripple voltage for a rear end output circuit thereby the cost of the circuit component can be reduced.

Figure 6:
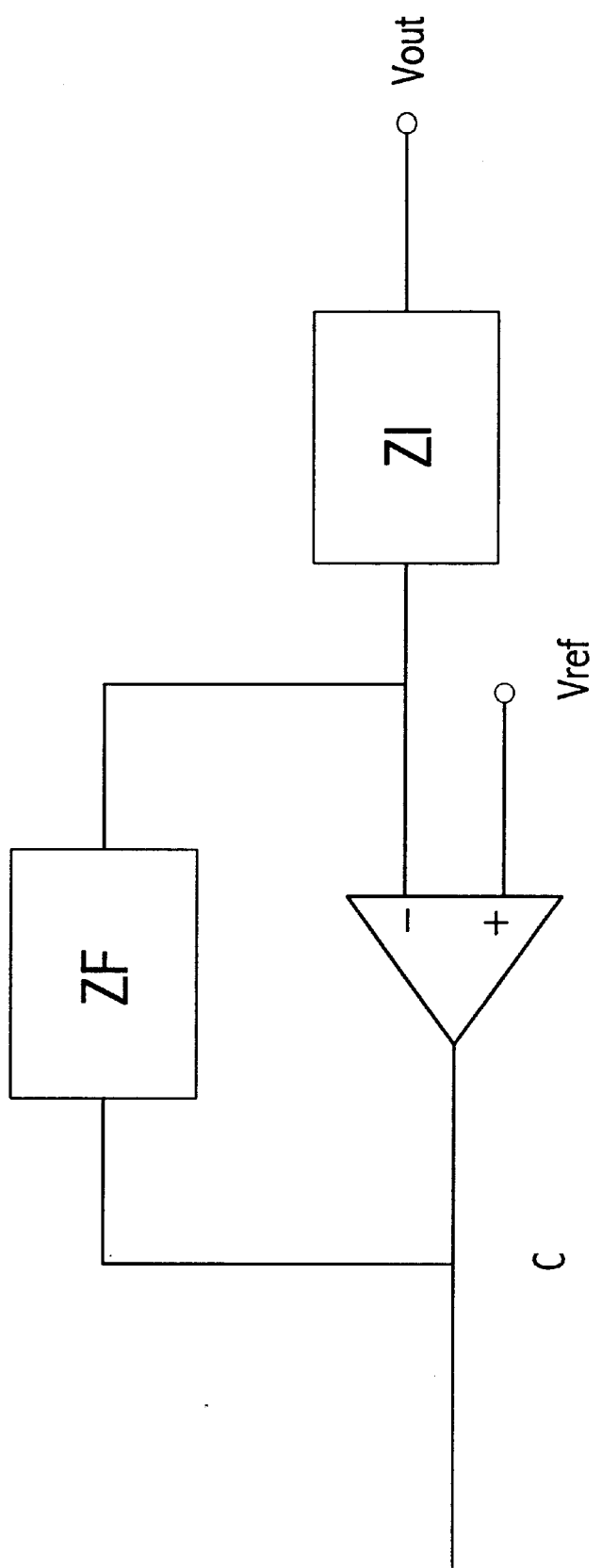
FIG. 6 schematically depicts a block diagram of an operation amplifier in the present invention.

FIG. 6 schematically depicts a block diagram of an operation amplifier in the present invention. A value of a reference voltage Vref is used in the basis of an OP amplifier to adjust the feedback so that the output voltage is steady. According to the present invention, the efficiency of the converting power is nearly more 86%. Compared with the conventional DC to DC converter, the efficiency of the converting power is increasingly improved which is only about 81%. Additional, the volume of the DC to DC converter is reduced by utilizing the ZVS technology.

While the invention has been described with reference to various illustrative embodiments, the description is not intended to be construed in a limiting sense. Various modifications of the illustrative embodiments, as well as other embodiments of the invention, will be apparent to those persons skilled in the art upon reference to this description. For instance, a bridge switch can be used to replace the half-bridge switch in FIG. 4. It is therefore contemplated that the appended claims will cover any such modifications or embodiments as may fall within the scope of the invention defined by the following claims and their equivalents.

What is claimed is:

1. A DC to DC converter with a ZVS circuit and a synchronized isolation circuit, comprising:

a transformer having a primary side coil and a second side coil;

a first switch coupled to the primary side coil of the transformer and having a control terminal;

a second switch coupled to the primary side coil of the transformer and having a control terminal;

a first synchronous rectifier coupled to the second side coil of the transformer and having a control terminal;

a second synchronous rectifier coupled to the second side coil of the transformer and having a control terminal; and an OP amplifier for adjusting a feedback amount of said DC to DC converter so that the output voltage is ready;

wherein the switching of said first switch and said second switch is achieved through a leakage inductance of said transformer and the enabling of said first synchronous rectifier and said second synchronous rectifier is achieved through the coil resistance of the transformer.

2. The DC to DC converter of claim 1, further comprising a voltage regulation stage, said voltage regulation comprises:

two primary side switches in parallel, a capacitor, a diode and an inductor.

3. The DC to DC converter of claim 1, wherein the switching rate between said first switch and said second switch is a 50% period in turn so as to achieve the ZVS function.

4. The DC to DC converter of claim 1, wherein said first switch and said second switch being coupled to a capacitor to form a half-bridge rectifier circuit.

5. The DC to DC converter of claim 1, wherein said first switch and said second switch being coupled to a capacitor to form a bridge rectifier circuit.

6. A DC to DC converter comprises:

a transformer having a primary side coil and a second side coil;

a voltage regulation circuit having two primary side switches in parallel, a capacitor, a diode and an inductor;

a first switch coupled to the primary side coil of the transformer and having a control terminal;

a second switch coupled to the primary side coil of the transformer and having a control terminal;

a first synchronous rectifier coupled to the second side coil of the transformer and having a control terminal;

a second synchronous rectifier coupled to the second side coil of the transformer and having a control terminal;

wherein the switching of said first switch and said second switch is achieved through a leakage inductance of said transformer and the enabling of said first synchronous rectifier and said second synchronous rectifier is achieved through the coil resistance of the transformer.

7. The DC to DC converter of claim 6, wherein the switching rate between said first switch and said second switch is a 50% period in turn so as to achieve the ZVS function.

8. The DC to DC converter of claim 6, further comprising an OP amplifier to adjust the feedback so that the output voltage is steady.

9. The DC to DC converter of claim 6, wherein said first switch and said second switch being coupled to a capacitor to form a half-bridge rectifier circuit.

10. The DC to DC converter of claim 6, wherein said first switch and said second switch being coupled to a capacitor to form a bridge rectifier circuit.

* * * * *